United States Statutory Invention Registration [19]

[11] Reg. Number: H824

Ghafoorzai [43] Published: Oct. 2, 1990

[54] PLANT STEM HOLDER

[76] Inventor: Serkai Ghafoorzai, 4031 Park Center, Apt. A, Fremont, Calif. 94538

[21] Appl. No.: 191,425

[22] Filed: May 9, 1988

[51] Int. Cl.[5] ..... A01G 17/06

[52] U.S. Cl. ..... 47/44; 47/59; 47/70; 47/81

[58] Field of Search ..... 47/59, 44, 70, 81, 47; 248/27–28, 121, 200.1, 219.3, 528

[56] References Cited

U.S. PATENT DOCUMENTS

| | | | |
|---|---|---|---|
| D. 172,500 | 6/1954 | Gurmin | 47/70 |
| 446,480 | 2/1891 | Stebbins | 248/200.1 |
| 457,977 | 8/1891 | Wilkening | 248/200.1 |
| 1,555,475 | 9/1925 | Maunz | 248/27.8 |
| 1,681,010 | 8/1928 | Raggio | 248/200.1 |
| 2,964,877 | 12/1960 | Gauding | 47/80 |
| 3,165,863 | 1/1965 | Duran | 47/70 |
| 3,188,771 | 6/1965 | Ballai | 47/81 |
| 3,345,774 | 10/1967 | Delbuguet | 47/44 |
| 3,411,749 | 11/1968 | Glassman | 248/200.1 |
| 4,006,559 | 2/1977 | Carlyon, Jr. | 47/59 |
| 4,074,461 | 2/1978 | Hirschman | 47/70 |
| 4,117,628 | 10/1978 | Smith | 47/59 |
| 4,584,792 | 4/1986 | Etzel | 47/70 |

FOREIGN PATENT DOCUMENTS

| | | | |
|---|---|---|---|
| 0058738 | 9/1982 | European Pat. Off. | 47/70 |
| 2519513 | 7/1983 | France | 47/70 |
| 2541076 | 8/1984 | France | 47/70 |

*Primary Examiner*—Charles T. Jordan
*Assistant Examiner*—Michael Carone
*Attorney, Agent, or Firm*—Lewis Arnold Thaxton

[57] ABSTRACT

The present invention relates to a plant stem holder, particularly potted house plants having tall or elongated stems. The plant support includes a unitary tripodal base having three radiating sleeves and consisting of three stub feet that also extend radially and horizontally outward from each sleeve. The screw type stub feet can be telescopically adjusted to secure the plant support to the inner wall of a round or oval planter. A single upright stanchion, having plant stem bracing means, depends from a central position on the tripodal base. A tier-type of plant stem extension assembly is securely mounted at the top end of the upright stanchion. The plant stem holder of this invention avoids damaging plant roots, effectively supports house plants, and presents an attractive appearance to the observer.

5 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PLANT STEM HOLDER

BACKGROUND OF THE INVENTION

This invention is directed to the field of plant stands in general, while having the specific purpose of vertically supporting plants in a planter.

Indoor gardening is one of the most popular pastimes in the United States. Virtually every home or office has at least one display of container plants, with some homes and offices decorated with sundry plants in every room. There seems to be an infinite variety of plants and flowers used in and out of doors nowdays.

While each species of plant has its indigenous attraction, some plants present a much greater challenge in terms of culture and display than do other species of plants. Proper lighting, soil moisture content, temperature, and soil $_p$H are crucial for most plants. Moreover, the environment requires attention to how the plant will be displayed. Tall plants, for example, including some of the more exotic plants, such as orchids, are not only difficult to cultivate and grow, but even far more difficult to display. These types of plates are extremely delicate, sensitive to the tough, and their roots must be protected along with the stems, foliage, and blooms.

Tall plants usually require a vertical supporting means. The typical plant owner often uses an ordinary wooden stick for this purpose, inserting the stick deep into the soil of the container and tying the plant thereto, at selected intervals. While such a technique proves to be sufficient in supporting many plants, sticks can and do damage important roots and may also damage foliage if not used with proper caution. Moreover, the use of sticks is also lacking in terms of appearance as well. One alternative to the use of sticks is the use of plant holders composed of materials currently found in some lawn and garden shops. However, these plant holders are only suitable for certain types of plants because their bottom portion must be buried in the soil where, they too, pose a threat to plant roots as do the noted sticks.

The prior art indicates limited recognition of such problems as reflected in U.S. Pat. No. 3,119,585, which issued on Jan. 28, 1984, to H. Austenson. The patentee discloses a Christmas tree support equipped with a base that acts as a retainer for water. Although Austnson's plant support does not penetrate the soil, one must note that the patented support is intended to be used with cut plants where no soil is required. Reisner, in U.S. Pat. No. 4,307,540 and issuing on Dec. 29, 1981, shows a plant holder used to display Christmas trees. The patentee's invention, however, is too large and bulky to support small, yet tall and/or elongated house plants. Additionally, Reisner's holder must penetrate the soil which could incur unwanted root damage.

The plant stem holder of the present invention suffers neither the disadvantage of penetrating the soil with the concomitant root destruction nor is it limited to use with only cut plants.

Accordingly, it is a general object of this invention to provide an upright support stand to hold the stem of a plant and provide principal support at points along the stem, which is above the base of the plant.

Another object of this invention is to provide an upright plant support holder having two spaced stem engagement portions attached to a rigid stanchion and a tripodal base to hold the stand in a vertical position.

Still another object of this invention is to provide a plant support holder that can enhance the support of tall and/or elongated plants by means of a detachably extended and tier-shaped assembly.

Yet another object of this invention is to provide a plant stem holder which may be assembled and disassembled without the use of any tools, and whose tripodal base can be adjustably secured to the inside wall of round or oval planters.

A further object of this invention is to provide an essentially hoolow plant stem holder that also functions as a reservoir for water or water containing the apposite plant nutrients, wherein the liquid is slowly emitted to the plant soil.

SUMMARY OF THE INVENTION

The present invention has been developed with a view toward providing a plant stem holder, particularly for house plants, although its use for yard plants is readily envisioned. The holder consists of a tripodal base having each of the three stub feet extending horizontally and radially outward, each from the other, and all from a focal point. A threaded cylindrical rod or stanchion projects upwardly from the center axis of the tripodal base and has an intermediately disposed brace for lacing several plant stems thereto. A second threaded cylindrical rod, that is equipped with several horizontally threaded rod-tiers, is detachably secured to the top end of the base stanchion.

A better understanding of the subject invention will be enabled when the following written description is read in conjunction with the appended drawings.

DESCRIPTION OF PREFERRED EMBODIMENTS

Figure 1:
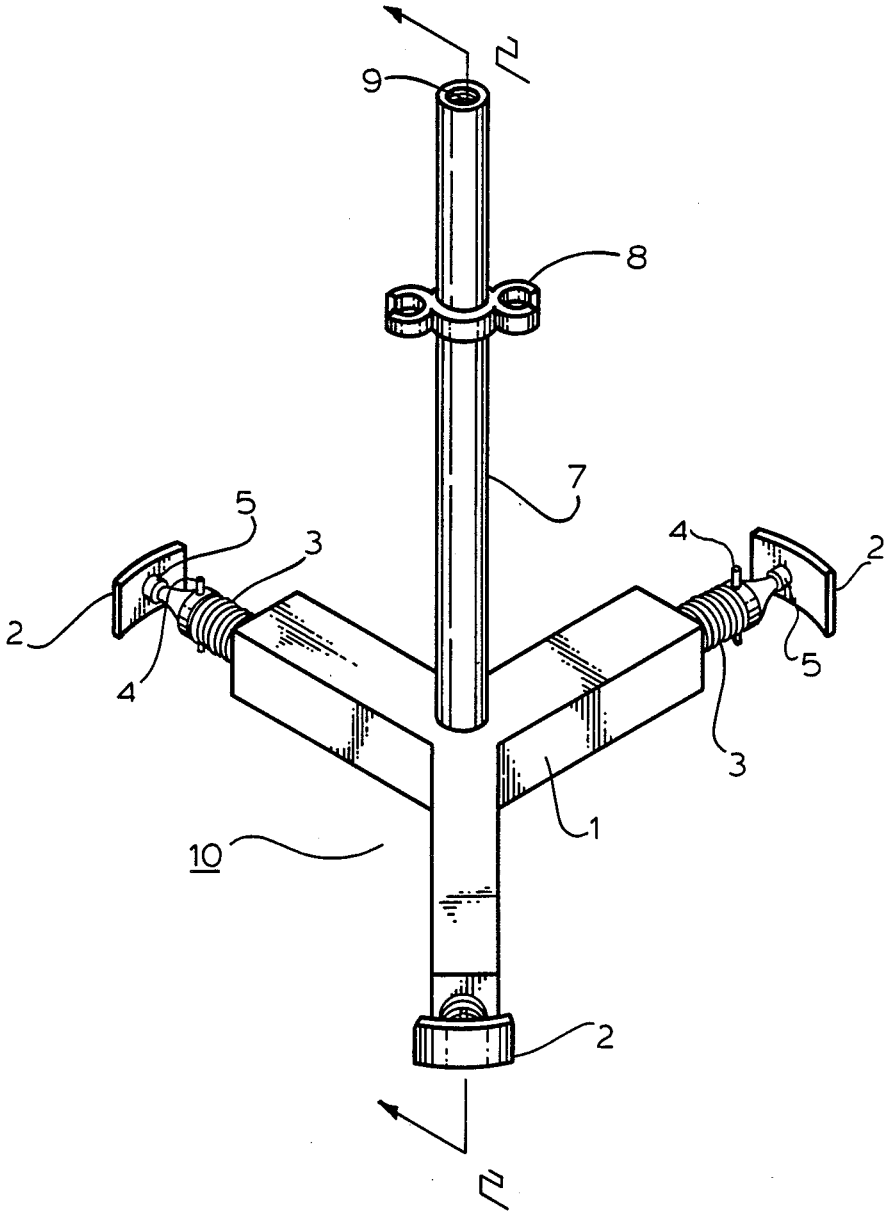
FIG. 1 is a perspective view of the plant stem holder of the invention.
Figure 2:
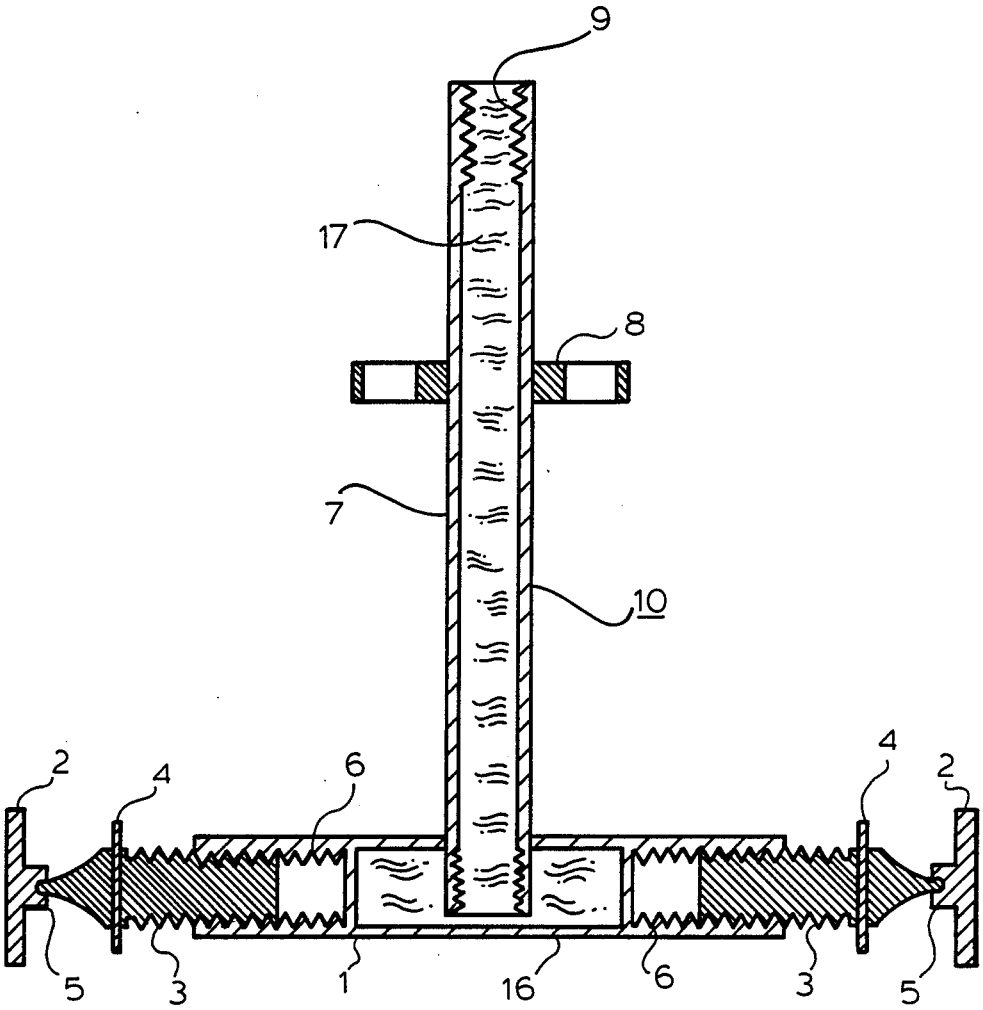
FIG. 2 is a cross-sectional view taken along line 2—2 of FIG. 1.

Referring now to the drawings, wherein like numerals refer to like parts throughout the several views. FIGS. 1 and 2 illustrate the plant stem holder 10 of the present invention which includes a tripodal sleeve base 1, having three stub feet extending horizontally and radially outward, divergent, one from the other, and each from a fixed focal point. Each stub foot consists of a cylindrical screw 3 equipped with an adjustment knurl 4. The knurls facilitate in and out rotation of the screws in variously positioning and securing the support inside the planter. A disk 2 is situated at the outer end of each screw 3 for the purpose of bracing the plant support to the inner wall of a selected planter. Each concavely molded plastic disk 2 contains an axially centered orifice 5 that mates with a narrower and outer point of screw 3.

In the embodiment of the invention shown, the base 1 is constituted as a unitized-hollow plastic stock material having internally commensurate spiral ridges 6 that matingly receive the threads of screw 3, as shown in FIG. 2. The independent stub foot screw 3 are each shown as solid plastic rods designed to fit matingly and telescopically into tripodal base 1.

The hollow plastic and cylindrical stanchion 7, having an intermediately disposed stem support brace 8, is affixed to base 1 by means of threads situated at its bottom end; shown cross-sectionally in FIG. 2. At its top end, stanchion 7 contains a threaded ridge 9, for receipt of an extension assembly. Stanchion 7, together with base 1, additionally functions as a reservoir holding a liquid 17 such as water or water containing plant nutrients. Liquid 17 is emitted into the plant soil via orifice 16. The regularity of supplying the liquid and the volume of the liquid may be adjusted within the holder to comply with suggested plant care instructions.

Figure 3:
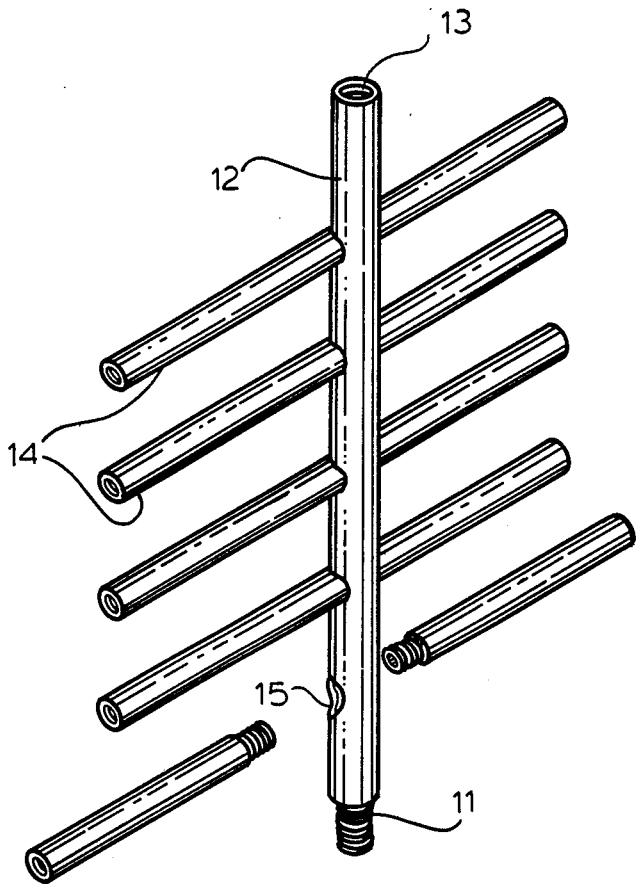
FIG. 3 is a perspective view of the plant stem extension assembly of the invention.

FIG. 3 particularly illustrates the structural arrangement of the plant stem extension assembly of this invention. The extension assembly constitutes a tier-type of configuration which consists of a centrally disposed and hollow rod 12, that is molded with a threaded bottom ridge 11, and situated on its top end, a threaded orifice 13. Rod 12 is also laterally equipped with equidistantly threaded holes 15. Detachable rods 14 are oppositely and horizontally screwed into holes 15 to produce an extension assembly having a tree-like or tier-type configuration that serves to further support a tall or elongated potted plant.

Figure 4:
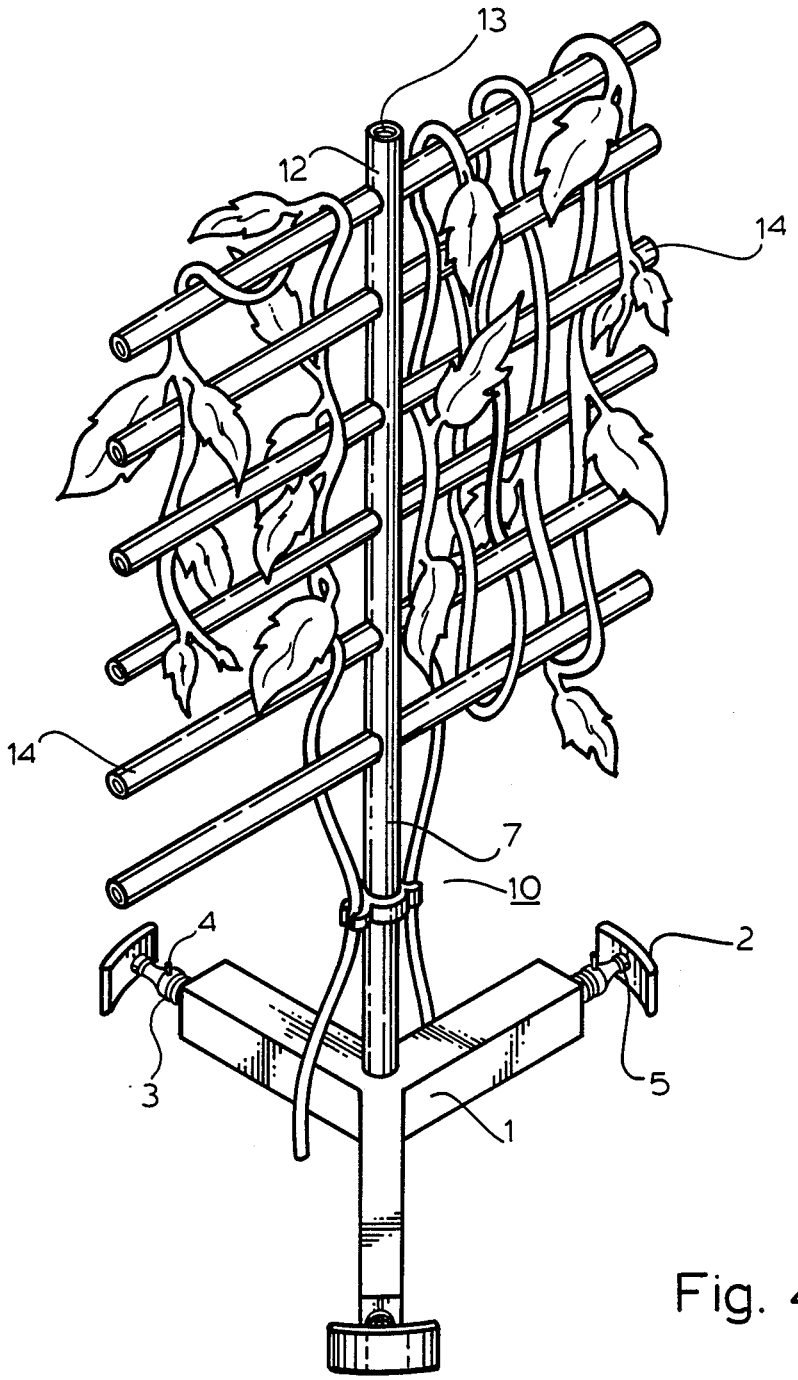
FIG. 4 is a perspective view of the plant stem holder of the invention showing its relationship to a plant being supported.

A plant may be fully supported as illustrated by the preferred embodiment of this invention in FIG. 4. A vine type of plant emanating from potted soil (not shown), has its stem running over base 1 and detachably, but securely, laced onto brace 3. The stems are interwovenly supported over rods 14 in the greatful absence of plant root damage thereto. Clearly, depending on the plant species to be supported, some of or all of rods 14 may be installed to attain that purpose.

In compliance to statues so governoring, the invention has been set forth in language more or less specific to account for structural and functional features. However, it is understood that the invention is not limited to the specific features shown but that means and construction herein disclosed comprise a preferred form of executing the invention, while numerous modifications of the disclosed embodiments will undoubtedly occur to those of skill in the art and the spirit and scope of the invention is to be limited solely in light of the appended claims.

I claim:

1. A plant holder for supporting the stem of a plant, said holder comprising:

a tripodal base member which consists of a unitized hollow structure having three sleeve formations, said sleeves containing adjustably threaded stub feet that extend horizontally and outwardly of each other and from a center point, each stub foot being terminated at its outer end with a disk and having, intermediately disposed near its outer end, an appended knurl, each of said stub feet being threadly engaged at its inner end to the tripodal base member;

a hollow and vertical stanchion, said stanchion extending integrally and upwardly from the center axis of the tripodal base, said stanchion being equipped with an intermediately positioned stem support brace; and a hollow extension assembly that consists of a central rod integrally mounted onto the top end of the stanchion, said central rod having horizontally opposed and equidistantly situated smaller rods detachably secured so as to provide a tier type plant support structure.

2. A plant holder according to claim 1, wherein the adjustably threaded stub feet, each of which is terminated at its outer end by a concavely molded plastic disk having an axially centered orifice, are engagedly united by means of the orifice receiving the narrower and outer point of each stub foot.

3. A plant holder according to claim 2, wherein the tripodal base member is anchored above the soil and to the inner wall of a round or oval planter.

4. A plant holder according to claim 1, wherein the intermediately positioned stem support brace provides for the releasable reception of at least two plant stems.

5. A plant holder according to claim 1, wherein the hollow portion of the tripodal base and vertical stanchion is provided with a liquid consisting of water or water containing plant nutrients.

* * * * *